(12) United States Patent
Minh et al.

(10) Patent No.: US 11,526,384 B2
(45) Date of Patent: *Dec. 13, 2022

(54) SYSTEMS AND METHODS CONFIGURED FOR BALANCING WORKLOAD AMONG MULTIPLE COMPUTING SYSTEMS

(71) Applicant: COUPANG CORP., Seoul (KR)

(72) Inventors: Hyun Sik Eugene Minh, Seoul (KR); Jin Kwang Kim, Gyeonggi-do (KR); Hyunjun Park, Gyeonggi-do (KR); Christopher Carlson, Seoul (KR)

(73) Assignee: Coupang Corp., Seoul (KR)

( * ) Notice: Subject to any disclaimer, the term of this patent is extended or adjusted under 35 U.S.C. 154(b) by 342 days.

This patent is subject to a terminal disclaimer.

(21) Appl. No.: 16/851,823

(22) Filed: Apr. 17, 2020

(65) Prior Publication Data
US 2021/0026706 A1    Jan. 28, 2021

Related U.S. Application Data

(63) Continuation of application No. 16/522,421, filed on Jul. 25, 2019, now Pat. No. 10,664,322.

(51) Int. Cl.
*G06F 9/46*   (2006.01)
*G06F 9/50*   (2006.01)
*G06F 9/48*   (2006.01)

(52) U.S. Cl.
CPC .......... *G06F 9/5083* (2013.01); *G06F 9/4881* (2013.01); *G06F 9/505* (2013.01);
(Continued)

(58) Field of Classification Search
CPC ...... G06F 9/5083; G06F 9/4881; G06F 9/505; G06F 2209/5019; G06F 2209/5022
See application file for complete search history.

(56) References Cited

U.S. PATENT DOCUMENTS 6,374,297 B1   4/2002  Wolf et al.
6,574,605 B1   6/2003  Sanders et al.
(Continued)

FOREIGN PATENT DOCUMENTS

CN   101828194   9/2010
JP   2005-104710  4/2005
(Continued)

OTHER PUBLICATIONS

Examination Report dated Dec. 8, 2020, by the Australian Patent Office in Australian Application No. 2020264384, 5 pages.
(Continued)

*Primary Examiner* — Wissam Rashid
(74) *Attorney, Agent, or Firm* — Finnegan, Henderson, Farabow, Garrett & Dunner LLP

(57) ABSTRACT

A computer-implemented method for balancing workload among one or more locations is disclosed. The method may comprise: receiving data associated with a workload forecast for a first location and a second location, the data comprising a number of orders expected to be received for the first and second locations for a predetermined period of time; determining a first set of ratios of workload forecast for the locations relative to a first sum of the workload forecast for the first and second locations, the first set of ratios comprising at least a first forecast ratio for the first location and a second forecast ratio for the second location; receiving electronic orders for the predetermined period of time, the electronic orders comprising one or more groups of items
(Continued)

and being assigned to one of the locations; and reassigning a first subset of electronic orders for the first location to the second location.

20 Claims, 10 Drawing Sheets

(52) U.S. Cl.
CPC .............. *G06F 2209/5019* (2013.01); *G06F 2209/5022* (2013.01)

(56) References Cited

U.S. PATENT DOCUMENTS

| | | |
|---|---|---|
| 7,243,074 B1 | 7/2007 | Pennisi, Jr. |
| 8,249,917 B1 | 8/2012 | Kassmann et al. |
| 10,664,322 B1 | 5/2020 | Minh et al. |
| 2007/0021864 A1 | 1/2007 | Mountz et al. |
| 2007/0088594 A1 | 4/2007 | Goodall et al. |
| 2014/0025535 A1 | 1/2014 | Douglas et al. |
| 2016/0086119 A1 | 3/2016 | Puchta et al. |

FOREIGN PATENT DOCUMENTS

| | | |
|---|---|---|
| JP | 2008-239337 | 10/2008 |
| JP | 2012-160007 | 8/2012 |
| KR | 10-2010-0062848 | 6/2010 |
| KR | 1017350180000 | 5/2017 |
| WO | WO 2019/128368 A1 | 7/2019 |

OTHER PUBLICATIONS

Australian Examination Report dated Jun. 29, 2021, by the Australian Patent Office in counterpart Australian Patent Application No. 2020264384, 4 pages.
Examination Notice from the Hong Kong Patent Office dated Jul. 16, 2021, in counterpart Hong Kong Application No. 22020010698. 1, 5 pages.
Hou, Xiaofei, "Dynamic Workload Balancing and Scheduling in Hadoop Mapreduce With Software Defined Networking," Jul. 2017, 119 pages.
Office Action from the Korean Patent Office dated Jul. 29, 2021, in counterpart Korean Application No. 10-2019-0108988, 17 pages.
Office Action from the Japanese Patent Office dated Aug. 24, 2021, in counterpart Japanese Application No. 2020-569058, 5 pages.
International Search Report and Written Opinion dated Oct. 7, 2020 in PCT International Application PCT/IB2020/056171, 7 pages.
Decision of Rejection dated Jan. 11, 2022, by the Japanese Patent Office in counterpart Japanese Application No. 2020-569058, 7 pages.
Notice of Allowance and Search Report dated Jan. 24, 2022, by the Taiwanese Patent Office in counterpart Taiwanese Application No. 110129290, 3 pages.
Notice of Allowance from the Japanese Patent Office dated May 26, 2022, in counterpart Japanese Application No. 2020-569058, 6 pages.

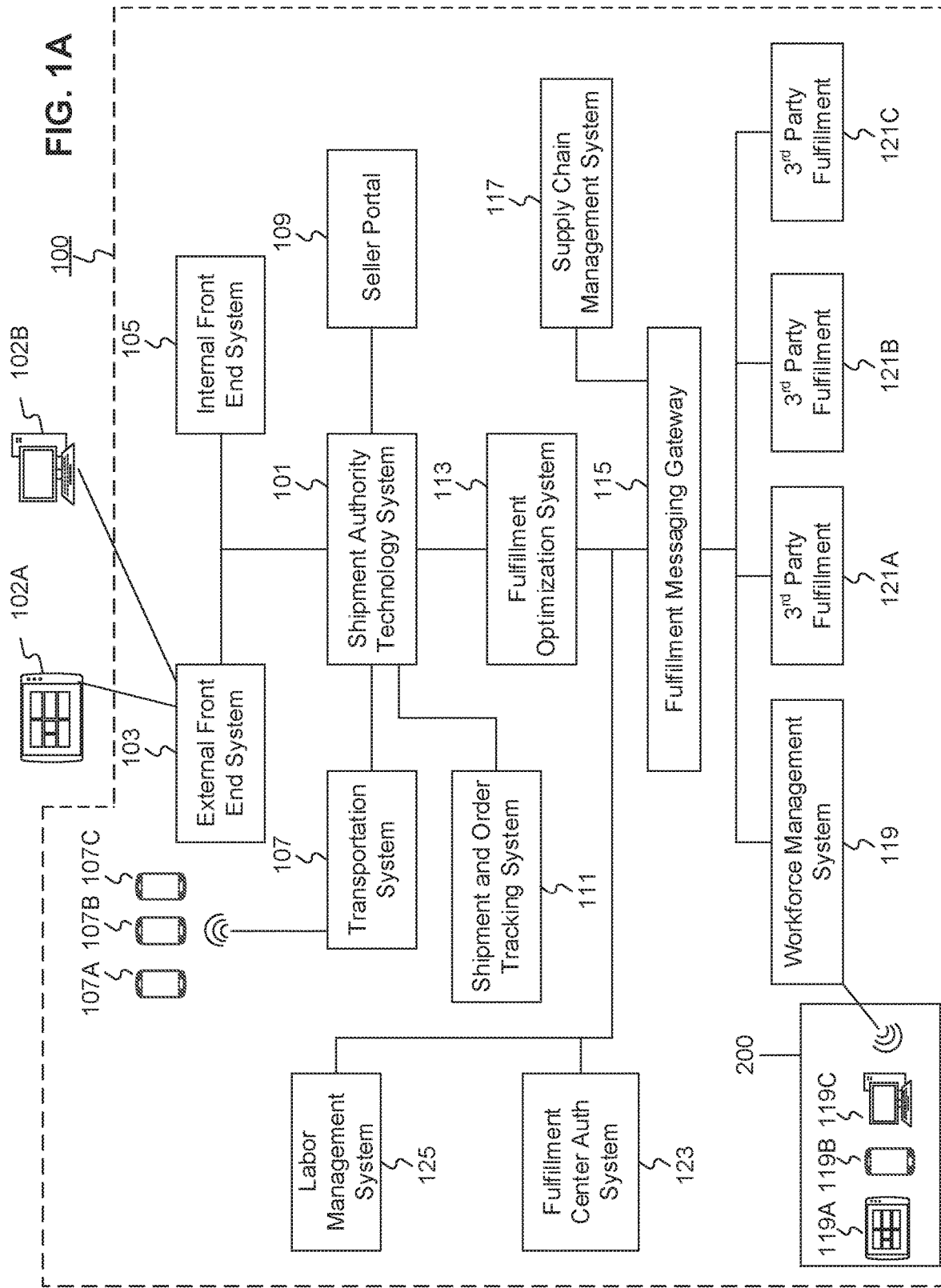

Favorites Application     login  Sign Up  Service center

[all]

My Account  Shopping Cart

Shipments  Fast Shipments  Christmas  Gold deals  Regular delivery  Events / Coupons  Planned Exhibition  Gift Cards Home > Food > Daily products / ice cream > Cheese > Fresh cheese > Mozzarella mozzarella cheese
285 Reviews    20,000 won

FREE Shipping
Tomorrow (Wed) 11/28 Arrival Guarantee
Weight per piece x Quantity : 1kg x 2 pieces

| 1 | Add to cart | Buy now |

- Country of origin: See product description
- Shelf Life: 2019-11-04
- Total quantity: 2
- Cheese form: crushed (powder)
- Item Number: 23532 - 3432551

Products purchased by other customers

| Rosé spaghetti sauce, 600g, 2... | Chunky Tomato Pasta... | Grated Parmesan cheese, | Bacon and Mushroom Cream Pasta Sauce | Chili sauce, 295ml, 1 | Hot sauce, |
|---|---|---|---|---|---|
| 6,500 won | 3,800 won | 6,460 won | 4,870 won | 2,370 won | 2,340 won |
| (54 won per 10g) | (86 won per 10g) | (285 won per 10g) | (108 won per 10g) | (80 won per 10ml) | (66 won per 10ml) |
| (3,721) | (545) | (1,330) | (3,193) | (2,552) | (245) |

| Product Details | Reviews (285) | Contact Us | Shipping & Returns |

Required notation information

| Type of food | Natural cheese / frozen products | Producers and Locations | Cheese Corp. / Republic of Korea |
|---|---|---|---|
| Date of manufacture, shelf life or quality maintenance | Shelf Life: Products manufactured on or after November 04, 2019 : Manufactured goods after May 19, 2018 | Capacity (weight), quantity by packing unit | 1kg, 2 pieces |
| Ingredients and | Content reference | nutrient | None |

FIG. 1C

| | Workload Forecast 401 | Forecast Ratio 403 | Target Workload 405 | Target Ratio 407 | Tolerance 409 | Tolerance Ratio 411 |
|---|---|---|---|---|---|---|
| Total | 1,000,000 | 100% | 1,000,000 | 100% | | |
| FC1 | 500,000 | 50% | 550,000 | 55% | 8% | 59.4% |
| FC2 | 300,000 | 30% | 290,000 | 29% | 5% | 30.5% |
| FC3 | 200,000 | 20% | 160,000 | 16% | 4% | 16.6% |

SYSTEMS AND METHODS CONFIGURED FOR BALANCING WORKLOAD AMONG MULTIPLE COMPUTING SYSTEMS

RELATED APPLICATIONS

This application is a continuation of U.S. patent application Ser. No. 16/522,421 (now allowed) filed on Jul. 25, 2019, which is hereby incorporated by reference in the present application.

TECHNICAL FIELD

The present disclosure generally relates to computerized methods and systems for reallocating workload among one or more locations. In particular, embodiments of the present disclosure relate to inventive and unconventional systems that monitor workload allocated to one or more locations compared to a predetermined target and reallocate the workload from one location to another in order to maximize efficient utilization of resources at the locations.

BACKGROUND

For a store receiving orders from a remote customer via methods such as the Internet, mail, phone, and fax, a typical order processing involves receiving the orders, retrieving ordered items from inventory, and shipping them to corresponding addresses. As the volume of orders and the number of items in the inventory increase, the store may need to establish multiple fulfillment centers that stock items in its inventory and ship to different addresses within a region.

The fulfillment centers may ship to a common region (e.g., a large metropolitan area and its rurals) and stock the same items in various quantities, but each will have its own pool of available workers, equipment, and facilities. These differences affect a fulfillment center's processing capacity (i.e., how many orders it can process in a given period of time) and fixed operating costs (e.g., utility fees, wages, and the like). Even if the store might have received orders that meet 100% of its total processing capacity across all fulfillment centers, misallocating the orders to different fulfillment centers can lead to unnecessary expenses. For example, a fulfillment center may be overloaded when it is allocated orders beyond its processing capacity, which can result in delayed processing or extra wages for overtime pay. On the other hand, another fulfillment center may be allocated orders less than its processing capacity, which can lead to underutilization of its resources, wasting a portion of the fixed operating cost.

Therefore, there is a need for improved methods and systems for balancing the number of orders or workload among multiple fulfillment centers in order to maximize respective processing capacity and/or minimize overloading. In addition to the even distribution of orders across the fulfillment centers, the improved methods and systems, in a broader scope, are further amenable to distributing any workload (e.g., computational workload in distributed computing) across multiple computing systems.

SUMMARY

One aspect of the present disclosure is directed to a computer-implemented method for balancing workload among one or more locations. The method may comprise: receiving data associated with a workload forecast for a first location and a second location, the data comprising a number of orders expected to be received for the first and second locations for a predetermined period of time; determining a first set of ratios of workload forecast for the locations relative to a first sum of the workload forecast for the first and second locations, the first set of ratios comprising at least a first forecast ratio for the first location and a second forecast ratio for the second location; receiving electronic orders for the predetermined period of time, the electronic orders comprising one or more groups of items and being assigned to one of the locations; and reassigning a first subset of electronic orders for the first location to the second location based on a second ratio of the electronic orders for the first location relative to a second sum of the electronic orders for the locations, the first forecast ratio, the second sum, and whether the first subset of electronic orders can be reassigned without increasing a total number of the one or more groups of items corresponding to the first subset of electronic orders.

Yet another aspect of the present disclosure is directed to a computer-implemented system for balancing workload among one or more locations. The system may comprise a non-transitory computer-readable medium configured to store instructions; and at least one processor configured to execute the instructions to perform operations. The operations may comprise: receiving data associated with a workload forecast for a first location and a second location, the data comprising a number of electronic orders expected to be received for the first and second locations for a predetermined period of time; determining a first set of ratios of workload forecast for the locations relative to a first sum of the workload forecast for the first and second locations, the first set of ratios comprising at least a first forecast ratio for the first location and a second forecast ratio for the second location; receiving electronic orders for the predetermined date, the electronic orders comprising one or more groups of items and being assigned to one of the locations; and reassigning a first subset of electronic orders for the first location to the second location based on a second ratio of the electronic orders for the first location relative to a second sum of the electronic orders for the locations, the first forecast ratio, the second sum, and whether the first subset of electronic orders can be reassigned without increasing a total number of the one or more groups of items corresponding to the first subset of electronic orders.

Furthermore, another aspect of the present disclosure is directed to a computer-implemented system for redistributing one or more orders among one or more warehouses. The system may comprise a non-transitory computer-readable medium configured to store instructions; and at least one processor configured to execute the instructions to perform operations. The operations may comprise: receiving data associated with an order forecast for a first warehouse and a second warehouse, the data being determined using an order simulation model and comprising a number of orders expected to be received for the first and second warehouses for a predetermined period of time; determining a first set of ratios of the order forecast for the warehouses relative to a first sum of the order forecast for the first and second warehouses, the first set of ratios comprising at least a first forecast ratio for the first warehouse and a second forecast ratio for the second warehouse; receiving electronic orders for the predetermined period of time, the electronic orders including one or more parcels of one or more items; assigning the orders to the warehouses based on an outcome of an order allocation model; determining a second ratio of the electronic orders for the first warehouse relative to a second sum of the electronic orders for the first and second warehouses; determining a third ratio of the electronic orders for the second warehouse relative to the second sum of the electronic orders for the warehouses; and reassigning a first subset of the electronic orders for the first warehouse to the second warehouse when the second ratio exceeds the first forecast ratio by less than a workload tolerance for the first warehouse, when the third ratio is less than the workload tolerance for the second warehouse, when the second sum exceeds the workload threshold, and when a number of parcels for the first subset of electronic orders will remain the same after the transfer.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

FIG. 1C depicts a sample Single Display Page (SDP) that includes a product and information about the product along with interactive user interface elements, consistent with the disclosed embodiments.

FIG. 4 is an exemplary table of information for determining target workloads and tolerances at different locations based on a forecast, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for balancing workload among multiple computing systems.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, workforce management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO system 113 that satisfies the search request. External front end system 103 may also request and receive (from FO system 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO system 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
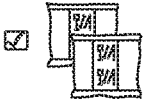
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from workforce management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Workforce management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
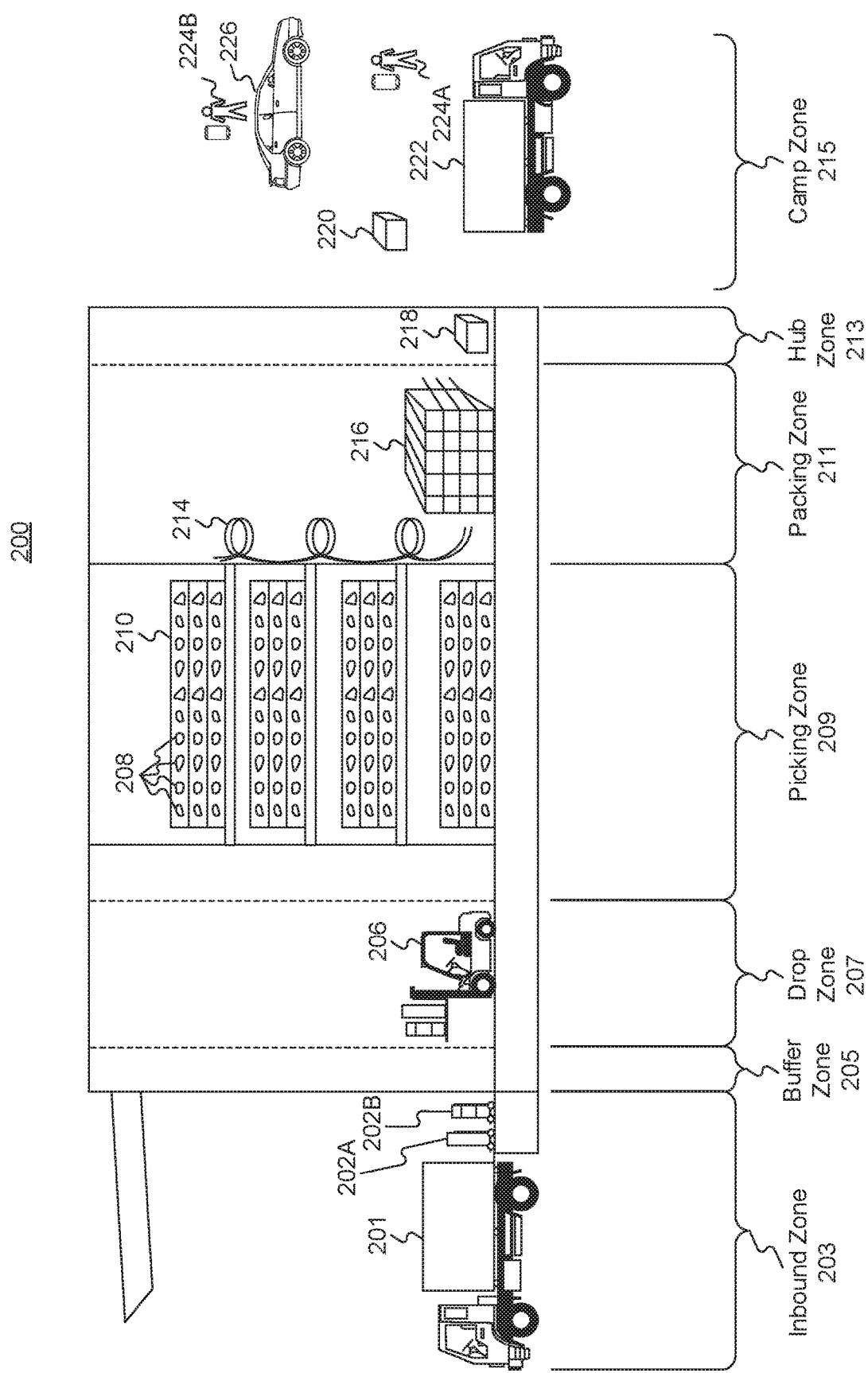
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119b to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
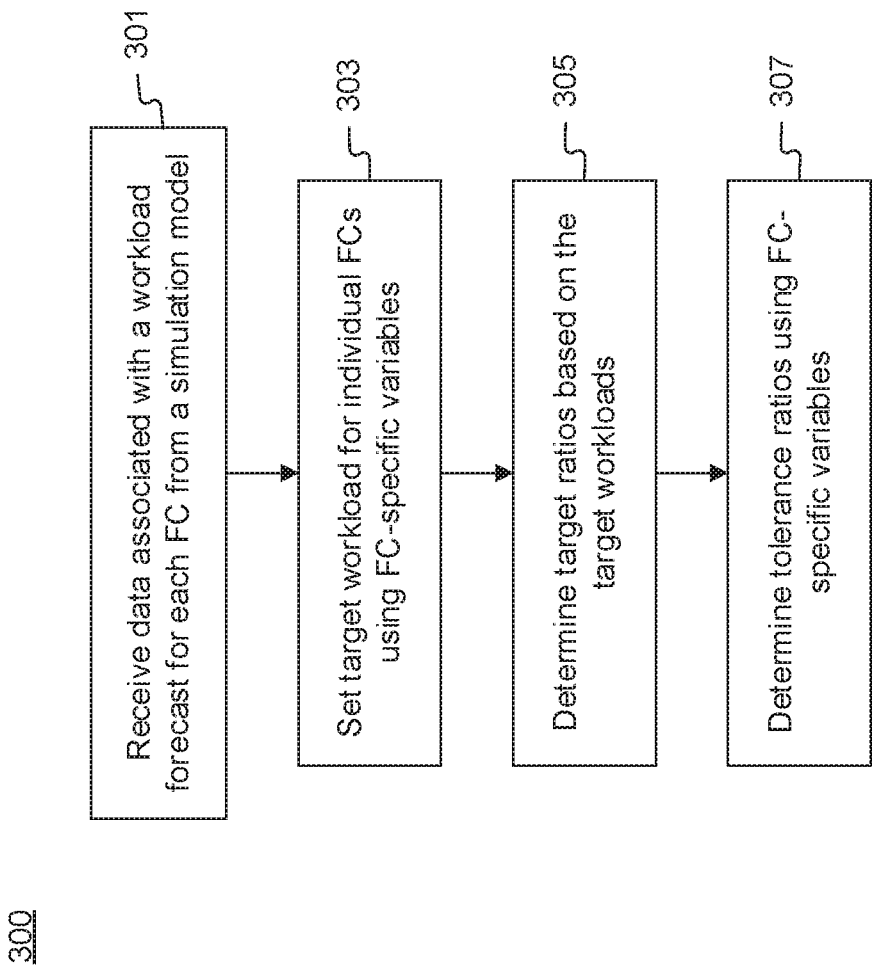
FIG. 3 depicts a flowchart of an exemplary computerized process for determining target ratios and tolerance ratios during a planning stage, consistent with the disclosed embodiments.

FIG. 3 depicts a flowchart of an exemplary computerized planning process 300. Planning process 300 may be performed, for example, at a planning stage during which FO system 113 may set a target workload for each fulfillment center (FC). FIG. 4 depicts a table 400 of exemplary values for different parameters determined during planning process 300. Planning process 300 is described below with reference to the exemplary values in table 400. For example, there may be a first FC (i.e., FC1), a second FC (i.e., FC2), and a third FC (i.e., FC3), each of which may be implemented, in some embodiments, as FC 200 (depicted in FIG. 2).

At step 301, FO system 113 may receive data associated with a workload forecast for each FC. Similar to the forecasting function described above with respect to generating purchase orders for individual products, SCM system 117 may forecast a level of workload for a particular FC for a particular period of time based on, for example, the level of demand for a particular product, time of the day, day of the year, upcoming holidays, location of the FC, and the like. SCM system 117 may generate such forecast data at any predetermined interval (e.g., 24 hours, 12 hours, 6 hours).

Such forecast data may be generated a predetermined period of time in advance (e.g., two days in advance). In some embodiments, the level of workload may include, among others, a number of orders expected to be received at an FC over a predetermined period of time (e.g., over 24 hours). For example, workload forecast 401 in FIG. 4 includes 500,000 orders at FC1, 300,000 at FC2, and 200,000 at FC3 for a total of 1,000,000 orders across all FCs. In this example, workload forecast 401 may refer to the number of orders expected to be received at each FC over a 24-hour period and is generated two days in advance at 12 AM. Another set of workload forecast 401 for the FCs for the following 24-hour period may be generated on the next day at 12 AM.

In some embodiments, an order may comprise one or more products, but the workload may only concern the number of orders. In other embodiments, SCM system 117 may factor the number of products associated with the orders in generating the workload forecast.

At step 303, FO system 113 may adjust workload forecast 401 using FC-specific variables for the forecasted period of time to determine target workload 405 for the forecasted time. For example, the FC-specific variables may be associated with an expected labor shortage at an FC for the forecasted time, planned closure of an FC, planned installation of new equipment at an FC, cost of shipping from the FC, financial situation of the FC, or the like. For example, target workload 405 shows 550,000 orders for FC1, 290,000 for FC2, and 160,000 for FC3, different from workload forecast 401 described above. In some embodiments, target workload 405 of an FC may stay unchanged from its workload forecast 401. Total target workload may also stay unchanged or deviate from the total workload forecast based on target workload 405 of all FCs. In some embodiments, adjustment of forecasted workload 401 may take place by a manual adjustment of the workload by a person knowledgeable of a particular FC's circumstances or by increasing or decreasing workload forecast 401 by a predetermined fixed value based on past history. Still further, in some embodiments, FO system 113 may attempt to compensate for underperformance of one FC by increasing the target workload 405 of another FC just as target workload 405 FC1 is increased to 550,000 orders from 500,000 orders in response to expected underperformance of FC2 and FC3.

At step 305, FO system 113 may determine target ratios 407 for each FC based on target workload 405 for individual FCs and the total target workload. For example, target ratios 407 for FC1, FC2, and FC3 are 55%, 29%, and 16%, respectively. In some embodiments, target ratios 407 may serve as the ideal distribution of the actual workload. For example, if workload forecast 401 was accurate and a total of 1,000,000 orders are actually received on the forecasted date, FC1, FC2, and FC3 ideally would have received 550,000, 290,000, and 160,000 orders, respectively. Alternatively, if the actual workload exceeded workload forecast 401 by 200,000 orders, FC1, FC2, and FC3 ideally would have received 660,000, 348,000, and 192,000 orders, respectively, in accordance with target ratios 407. In some embodiments, forecast ratio 403 may be used as target ratio 407 without adjustment.

Distributing workload based on target ratios 407 instead of target workload 405 may allow distribution of workload regardless of the actual workload even while the workload is still accruing. Furthermore, such distribution scheme may allow even distribution of workload relative to the resources (e.g., labor force, inventory, etc.) available at each FC, which may minimize unbalanced distribution where one FC has too much work to do, incurring additional operating costs, while another has too little, wasting the operating costs already vested for the day.

More broadly, this distribution of workload based on ratio (i.e., relative workload) instead of actual amount (i.e., absolute workload) may also be applicable to other technical areas such as distributed computing. In distributed computing, multiple computer systems are utilized to complete large computational tasks. A traditional distributed computing may distribute the computational tasks evenly among the computer systems regardless of their respective computational capacity, assign the maximum amount each computer system can handle in sequence until all workload is assigned, allocate workloads in small batches as each computer system requests, or the like. Each of these methods, however, may result in over- or underutilization of computational resources at each computer system. On the contrary, assessing available resources at each computer system first, determining their relative capacities, and assigning workload based on the ratio in a manner consistent with the disclosed embodiments may allow even utilization of resources regardless of the different amounts available at each computer system.

Referring back to FIG. 3, at step 307, FO system 113 may also determine tolerance ratio 411 for the FCs based on tolerance 409 preassigned for each FC based on FC-specific variables. In some embodiments, tolerance 409 may indicate a degree of additional workload an FC may be capable of processing. For example, FC1 may be able to process 8% more workload than planned if necessary, while FC2 may be able to process 5% more, and FC3, 4% more. The FC-specific variables may include, for example, availability of workers that can work overtime, level of inventory, cost of shipping from the FC, financial situation of the FC, and the like. In some embodiments, tolerance may also change over time because of some of the FC-specific variables may fluctuate over the course of a day. For example, recruiting additional workers for a night shift may be easier to do in the morning compared to doing the same in the late afternoon.

Based on tolerances 409, FO system 113 may determine tolerance ratio 411, which, in this example, may be 59.4%, 30.5%, and 16.6% for FC1-3, respectively, computed by increasing individual target ratios 407 by respective tolerances 409. In some embodiments, the sum of tolerance ratios 411 may be greater than 100%. In other embodiments, FO system 113 may further adjust tolerance ratios 411 proportionally to total 100%.

Figure 5:
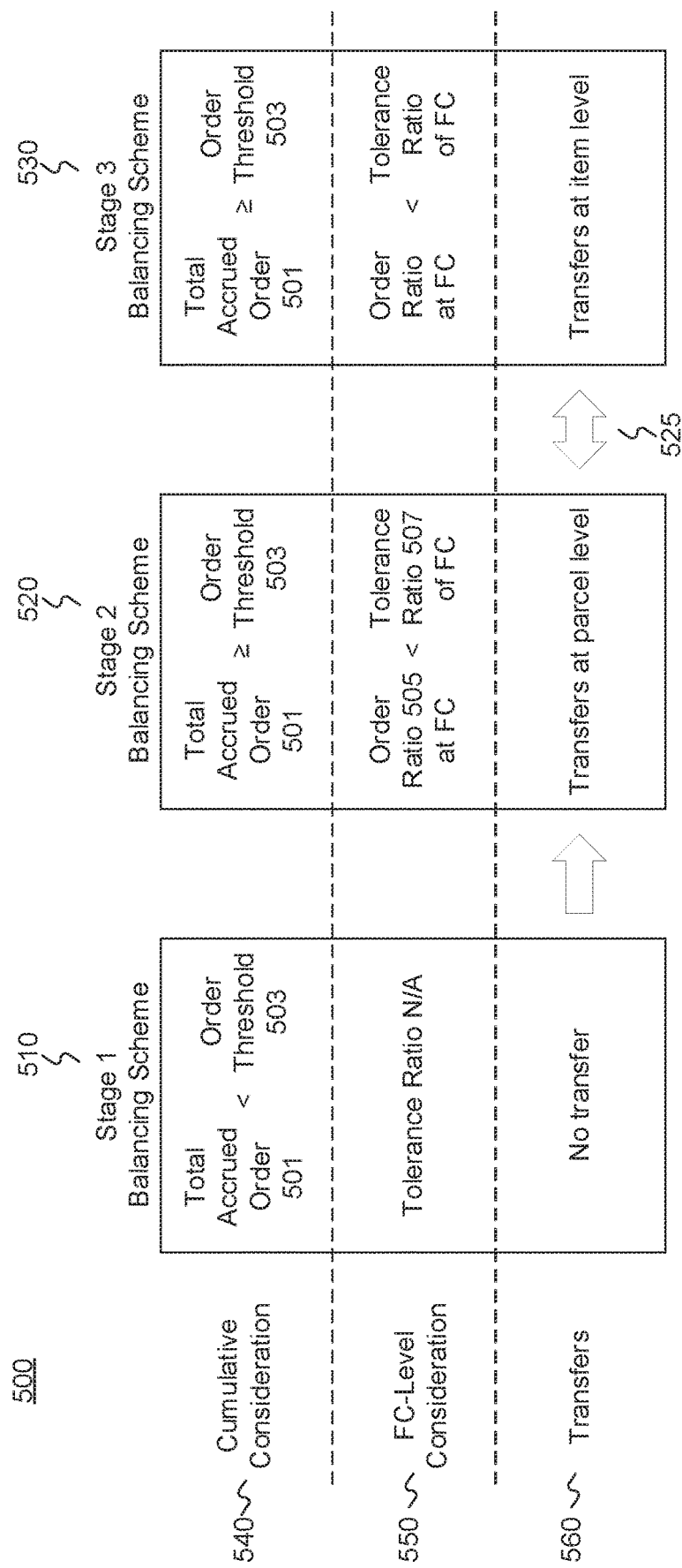
FIG. 5 depicts a diagram of an exemplary computerized process for determining appropriate action at different stages of workload reallocation, consistent with the disclosed embodiments.

FIG. 5 depicts a diagram of an exemplary computerized workload balancing process 500 performed by FO system 113. As to be described below, the process may be divided into three stages that dictate the type of workload transfer authorized under each stage (row 560). FO system 113 may determine the stage applicable to an FC based on considerations at the aggregate level (row 540) and at the FC-level (row 550). As such, the determination of the appropriate stage is FC-specific, and different FCs may operate under different stages at a given point in time.

Figure 6:
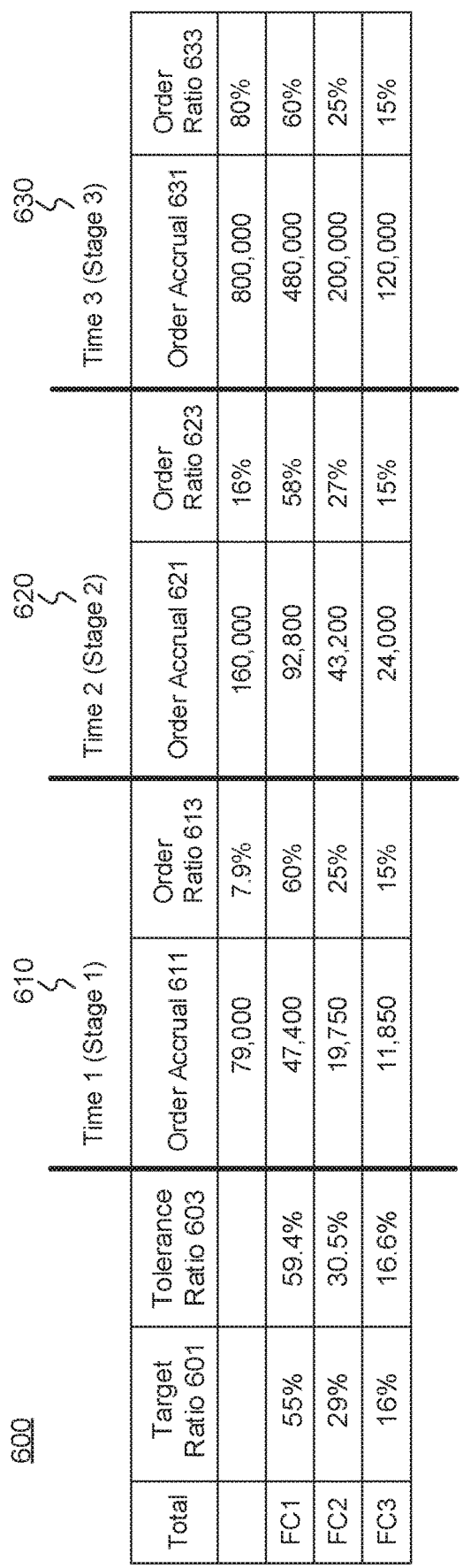
FIG. 6 is an exemplary table of information describing the computerized process of reallocating workload, consistent with the disclosed embodiments.

FIG. 6 depicts a table 600 of exemplary values for the parameters that affect FO system's 113 determination of different stages. The exemplary values in table 600 are also related to the parameters described above with respect to FIG. 4 for consistency. Workload balancing process 500 is described below with reference to the exemplary values in table 600.

After the planning stage described above with respect to FIGS. 3 and 4, FO system 113 may store the determined values (e.g., target ratios 407, tolerance ratios 411) in a database (not shown) until the forecasted time arrives. For example, workload forecast 401 may have been generated for a date two days in the future, and FO system 113 may store the determined values until the date actually arrives.

At the actual forecasted time, external users may begin placing orders via external front end system 103 in the manner described above. And accordingly, FO system 113 may begin assigning the orders to FCs under stage 1 balancing scheme 510. The initial assignments may be based on factors such as recipient addresses, FCs' addresses, inventory at the FCs, and the like. In some embodiments, FO system 113 may continue to make these initial assignments to FCs regardless of which balancing scheme is applied to a particular FC. Each FC may also begin processing the orders as they are assigned.

In some embodiments, FO system 113 that assigns orders to the FCs may be located at a central system that oversees each of the FCs. In other embodiments, FO system 113 may be located at one of the FCs. In either embodiments, assigning an order may comprise transmitting the details of the order including a list of items and their quantities, a delivery address, PDD, or the like. The receiving FC may add the order to a first-in-first-out (FIFO) data structure (e.g., a queue), from which assigned orders are processed (i.e., picked, packed, and delivered as described above with respect to FIG. 2) in sequence or in parallel by multiple order processing systems located at the receiving FC. Furthermore, reassigning or transferring an order to another FC may comprise removing the order from the FIFO data structure of the transferring FC, transferring the order and its corresponding order information to the receiving FC, and adding the order to the FIFO data structure of the receiving FC.

In some embodiments, FO system 113 may continue applying stage 1 balancing scheme 510 until the total accrued order 501 is less than order threshold 503. Order threshold 503 may be a predetermined amount of orders that must be assigned across all FCs before FO system 113 determines that the FCs should begin applying stage 2 balancing scheme 520. Order threshold 503 may be determined based on a predetermined percentage of the total workload forecast determined by SCM system 117. In some embodiments, order threshold 503 may be a value less than the total workload forecast so that FO system 113 may begin transferring (i.e., reassigning) orders early on from an FC with a relatively high workload to another with a relatively low workload. For example, order threshold 503 may be 10% of the total workload forecast 401 (shown in FIG. 4), which would be 100,000. Having an order threshold 503 higher than the total workload forecast may not ensure enough time to balance the workload as explained more in detail below.

Order threshold 503 and the predetermined percentage may be set using an optimization model based on historical data such as the rate at which order accrues at a given time of the day and the flexibility of FCs in accommodating additional workloads at different time of the day. For example, a low order threshold 503 may prompt FO system 113 to apply stage 2 balancing scheme 520 relatively early, increasing the likelihood of order transfers and thus incurring additional operating costs associated with processing an order from a different FC. The original FC where an order is initially assigned might have been the best choice, and processing the order from another FC may incur additional costs due to longer delivery distance or more expensive labor. On the other hand, a high order threshold 503 may delay order transfers, which may limit the number of transfers that can be made because of restrictions on time or resources. For example, FO system 113 may not be able to transfer an order to an FC that has finished hiring night shift workers because the FC may not be able to handle additional workload without additional workers but cannot hire any more.

Referring to FIG. 6, at time 1 610, the total order accrual 611 is 79,000, which is less than the order threshold of 100,000 set based on 10% of the total workload forecast 401. Therefore, FO system 113 may not authorize any transfers between FCs even though ratio 613 of FC1 is greater than its tolerance ratio 411 of 59.4% shown in FIG. 4.

Once the total accrued order 501 becomes greater than or equal to order threshold 503, FO system 113 may begin applying stage 2 balancing scheme 520 to all FCs. At this stage, FO system 113 may only authorize transfer of orders at parcel level, which may be distinct from transferring at item level.

In some embodiments, an order may include one or more items, which may be packaged into one or more parcels. A parcel may refer to a group of items packaged together in one container such as a box. In some embodiments, a parcel may have associated fixed costs, which may include the cost of the container, packaging materials, a minimum shipping fee, or the like. Transferring an order at item level may result in splitting a parcel so that a subset of the items intended to be shipped together is shipped from one FC while another subset of the items is shipped from a different FC. Therefore, transferring an order at item level, while effective for balancing workload among the FCs, may increase the operating costs as a whole across all FCs. As such, in order to minimize additional cost as much as possible, FO system 113 may only authorize transfers at parcel level under stage 2 balancing scheme 520 or authorize them in a way that does not incur additional cost or only incurs a nominal amount.

For example, at time 2 620 in FIG. 6, the total order accrual 621 is 160,000, which exceeds the order threshold of 100,000. In this case, FO system 113 may have been transferring orders between FCs from the point when order accrual 621 reached 100,000 orders. In some embodiments, the transfers may occur between two FCs based on their respective order ratio 623 and target ratio 601 (determined in a manner described above with respect to FIG. 3).

For example, in table 600, order ratio 623 of FC1 (58%) is greater than target ratio 601 of FC1 (55%). In this case, FO system 113 may authorize transfer of orders at parcel level from FC1 to either FC2 or FC3, because order ratios 623 of FC2 and FC3 are both below their respective target ratios 601. In some embodiments, when more than one FC is available to receive the transfer, FO system 113 may pick one FC based on distance between the FC and the recipient's address, stock level of the ordered item, or the like. If no parcel level transfer can be made because the destination FC (i.e., FC2 or FC3 in this case) does not have a necessary item in stock, FO system 113 may leave the order with its current FC.

In some embodiments, FO system 113 may continue transferring orders under stage 2 balancing scheme 520 for a particular FC while its order ratio 505 is less than its tolerance ratio 507. Once the FC's order ratio 505 becomes greater than or equal to its tolerance ratio 507, FO system 113 may apply stage 3 balancing scheme 530 to the FC. FO system 113 may continue applying stage 2 balancing scheme 520 for other FCs where the corresponding order ratio 505 is still less than the corresponding tolerance ratio 507. For example, at time 3 630 in FIG. 6, order ratio 633 of FC1 (60%) is greater than tolerance ratio 603 of FC1 (59.4%), indicating that FO system 113 is applying stage 3 balancing scheme 530 for FC1. On the other hand, order ratio 633 of FC2 and FC3 are each less than corresponding tolerance ratios 603, indicating that FO system 113 is still applying stage 2 balancing scheme 520 for FC2 and FC3.

In some embodiments, exceeding tolerance ratio 507 may indicate that the corresponding FC is at risk of overloading its capacity. An overloaded FC may fail to process all orders assigned to it for a given period of time or may need to incur additional costs to process all orders. Therefore, under stage 3 balancing scheme 530, FO system 113 may transfer orders from one FC to another at item level. In other words, FO system 113 may split a parcel into two or more smaller units and transfer one or more of the smaller units to other FCs. Such item level transfers may incur additional costs as described above, but the additional cost may be substantially small relative to the cost associated with overloading an FC. Similar to parcel level transfers, if no item level transfer can be made because the destination FC does not have a necessary item in stock, FO system 113 may leave the order with its current FC.

In some embodiments, FO system 113 may switch between stage 2 or stage 3 balancing schemes back and forth for an FC based on the comparison of corresponding order ratio 505 and tolerance ratio 507, as indicated by arrow 525, as order ratio 505 fluctuates because of transfers and newly assigned orders.

Furthermore, in some embodiments, authorized workers at the FCs may use a user interface (not shown) associated with FO system 113 to configure one or more settings that open or close an FC to transfers. For example, the authorized workers may open his or her FC to accept incoming transfers from other FCs or close the FC to block incoming transfers. Additionally or alternatively, the authorized workers may open his or her FC to allow outgoing transfers to other FCs or close to prevent outgoing transfers.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented method for balancing workload among one or more locations, the method comprising:
    receiving data associated with a workload forecast for a plurality of locations, the data comprising a number of orders expected to be received for the plurality of locations for a predetermined period of time;
    determining a first set of ratios of workload forecast for the plurality of locations relative to a first sum of the workload forecast for the plurality of locations based on available processing capacities of the plurality of locations;
    receiving electronic orders for the predetermined period of time; and
    reassigning a first subset of electronic orders for a first location of the plurality of locations to a second location of the plurality of locations based on the first set of ratios,
    wherein the reassigned subset of electronic orders are configured to balance a distribution of load among the plurality of locations based on the available processing capacities of the plurality of locations.

2. The computer-implemented method of claim 1, wherein the data associated with a workload forecast is determined using a simulation model based on a level of demand, geographical location of the plurality of locations, and a time of the year.

3. The computer-implemented method of claim 1, wherein determining the first set of ratios comprises adjusting the workload forecast for a subset of the plurality of locations based on circumstances associated with the subset of the plurality of locations.

4. The computer-implemented method of claim 1, wherein determining the first set of ratios comprises adjusting the workload forecast by a user input corresponding to a subset of the plurality of locations.

5. The computer-implemented method of claim 1, wherein determining the first set of ratios comprises adjusting the first set of ratios by a set of tolerance ratios corresponding to the plurality of locations.

6. The computer-implemented method of claim 5, further comprising determining the set of tolerance ratios based on projected processing capacities of the plurality of locations.

7. The computer-implemented method of claim 1, wherein receiving the electronic orders comprises assigning the electronic orders to different locations among the plurality of locations.

8. The computer-implemented method of claim 7, wherein assigning the electronic orders is based on at least one of a destination address, addresses of the plurality of locations, or inventories at the plurality of locations.

9. The computer-implemented method of claim 7, wherein assigning the electronic orders continues at least until a number of the electronic orders is less than a predefined threshold.

10. The computer-implemented method of claim 1, further comprising reassigning additional subsets of the electronic orders from the first location to the second location at least until a tolerance ratio for the first location is reached, the tolerance ratio being determined based on the first set of ratios.

11. A computer-implemented system for balancing workload among one or more locations, the system comprising:
a non-transitory computer-readable medium configured to store instructions; and
at least one processor configured to execute the instructions for:
receiving data associated with a workload forecast for a plurality of locations, the data comprising a number of orders expected to be received for the plurality of locations for a predetermined period of time;
determining a first set of ratios of workload forecast for the plurality of locations relative to a first sum of the workload forecast for the plurality of locations based on available processing capacities of the plurality of locations;
receiving electronic orders for the predetermined period of time; and
reassigning a first subset of electronic orders for a first location of the plurality of locations to a second location of the plurality of locations based on the first set of ratios,
wherein the reassigned subset of electronic orders are configured to balance a distribution of load among the plurality of locations based on the available processing capacities of the plurality of locations.

12. The computer-implemented system of claim 11, wherein the data associated with a workload forecast is determined using a simulation model based on a level of demand, geographical location of the plurality of locations, and a time of the year.

13. The computer-implemented system of claim 11, wherein determining the first set of ratios comprises adjusting the workload forecast for a subset of the plurality of locations based on circumstances associated with the subset of the plurality of locations.

14. The computer-implemented system of claim 11, wherein determining the first set of ratios comprises adjusting the workload forecast by a user input corresponding to a subset of the plurality of locations.

15. The computer-implemented system of claim 11, wherein determining the first set of ratios comprises adjusting the first set of ratios by a set of tolerance ratios corresponding to the plurality of locations.

16. The computer-implemented system of claim 15, wherein the instructions further comprise determining the set of tolerance ratios based on projected processing capacities of the plurality of locations.

17. The computer-implemented system of claim 11, wherein receiving the electronic orders comprises assigning the electronic orders to different locations among the plurality of locations.

18. The computer-implemented system of claim 17, wherein assigning the electronic orders is based on at least one of a destination address, addresses of the plurality of locations, or inventories at the plurality of locations.

19. The computer-implemented system of claim 17, wherein assigning the electronic orders continues at least until a number of the electronic orders is less than a predefined threshold.

20. A computer-implemented system for redistributing one or more orders among one or more warehouses, the system comprising:
a non-transitory computer-readable medium configured to store instructions; and
at least one processor configured to execute the instructions for:
receiving data associated with an order forecast for a plurality of warehouses, the data being determined using an order simulation model and comprising a number of orders expected to be received for the plurality of warehouses for a predetermined period of time;
determining a first set of ratios of the order forecast for the plurality of warehouses relative to a first sum of the order forecast for the plurality of warehouses based on projected processing capacities of the plurality of warehouses;
receiving electronic orders for the predetermined period of time;
assigning the electronic orders to the plurality of warehouses based on an outcome of the order allocation model;
reassigning a subset of the electronic orders for a first warehouse to a second warehouse, wherein the reassigned subset of electronic orders are configured to balance a distribution of load among the plurality of warehouses based on available processing capacities of the plurality of warehouses; and
fulfilling the electronic orders at corresponding warehouses where the electronic orders are assigned or reassigned.

* * * * *